United States Patent [19]

Schopp

[11] 4,194,695
[45] Mar. 25, 1980

[54] IRRIGATION EMITTER SYSTEM

[76] Inventor: Edgar Schopp, 2210 Gratton St., Riverside, Calif. 92504

[21] Appl. No.: 905,594

[22] Filed: May 15, 1978

[51] Int. Cl.² ............................................. B05B 15/00
[52] U.S. Cl. .................................. 239/542; 239/590.3
[58] Field of Search .................. 239/542, 547, 590.3, 239/145, 600

[56] References Cited

U.S. PATENT DOCUMENTS

| 3,797,738 | 3/1974 | Fitzhugh | 239/542 X |
| 3,814,377 | 6/1974 | Todd | 239/542 X |
| 3,863,845 | 2/1975 | Bumpstead | 239/542 |
| 3,958,761 | 5/1976 | Watanabe | 239/542 |
| 3,973,732 | 8/1976 | Diggs | 239/542 |

Primary Examiner—John J. Love
Attorney, Agent, or Firm—Harvey S. Hertz

[57] ABSTRACT

An irrigation emitter system utilizes a tubular adapter member which is formed of non-rigid plastic material. Self-sealing coupling plugs are connected through the wall surfaces of the adapter member to couple liquid from the adapter member to outlet tubes. A pressure reducing mechanism is formed in the adapter member for enabling the plugs to be coupled directly to the tubes for distribution of the liquid.

5 Claims, 2 Drawing Figures

IRRIGATION EMITTER SYSTEM

BACKGROUND OF THE INVENTION (1) Field of the Invention

The field of art to which the invention pertains includes the field of irrigation systems, particularly, with respect to an adapter having a pressure regulator therein for enabling direct couupling of liquid distribution to be made from the adapter.

(2) Description of the Prior Art

Conventional irrigation emitter systems utilize an adapter member having a drip regulator emitter connected thereto. Distribution hoses in turn are coupled to the drip regulator emitter. A pressure regulator, typically coupled between the main water line and the adaper, will either fail, when a predetermined amount of water pressure is exceeded, or will prevent water from flowing altogether.

The present invention eliminates the need for utilizing a drip regulator emitter intermediate the distribution hoses and the pressure regulated adapter. The present invention utilizes a relatively simple pressure member enabling self-sealing coupling plugs to interconnect the flexible distribution hose directly to the adapter.

SUMMARY OF THE INVENTION

An irrigation emitter system utilizes a tubular adapter member formed of non-rigid plastic material. A self sealing coupling plug is secured to the wall surfaces of the adapter member and has outlet hoses coupled thereto. A pressure reducing mechanism is provided directly in the adapter member.

The advantages of this invention, both as to its construction and mode of operation, will be readily appreciated as the same becomes better understood by regerence to the following detailed description when considered in connection with the accompanying drawings in which like reference numbers designate like parts throughout the figure.

DESCRIPTION OF THE PREFERRED EMBODIMENTS

Figure 1:
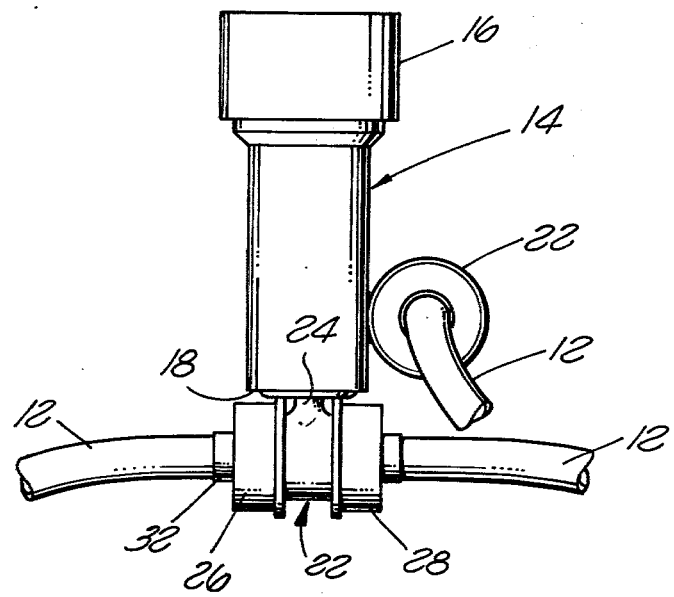
FIG. 1 is a top plan view of the prior art liquid distribution system.

Referring now to FIG. 1, there is shown a prior art irrigation emitter system which is used to distribute liquid from a source (not shown) through a plurality of flexible hoses 12. Typically, the flexible hoses 12 are strategically placed in an irrigated farmland so that the liquid can be utilized to feed a crop. The prior art system of FIG. 1 includes a tubular member 14 having a female coupling ring 16 at one end thereof and a closed end 18 at the other end thereof. As is conventional, the coupling ring 16 is secured to the male outlet of the liquid source. Alternatively of course, the male and female couples could be reversed.

A drip-regulation emitter 22 is shown coupled to the tubular member 14 by means of a probe 24 which protrudes through the closed end 18. The emitter 22 further contains a pair of end caps 26 and 28 which are fastened to the emitter body. The flexible hoses 12 are each secured to a coupling outlet 32 integrally formed with the end caps 26 and 28 of the emitter 22.

To prevent the flexible hoses 12 from separating from the coupling outlets 32, a conventional pressure regulator is coupled between the main water supply line (not shown) and the tubular member 14. It has been found, however, that use of the prior art conventional pressure regulator results in complete water flow turnoff once the water pressure exceeds a predetermined amount or, alternatively, a much greater restricted flow of water than is desirable.

Figure 2:
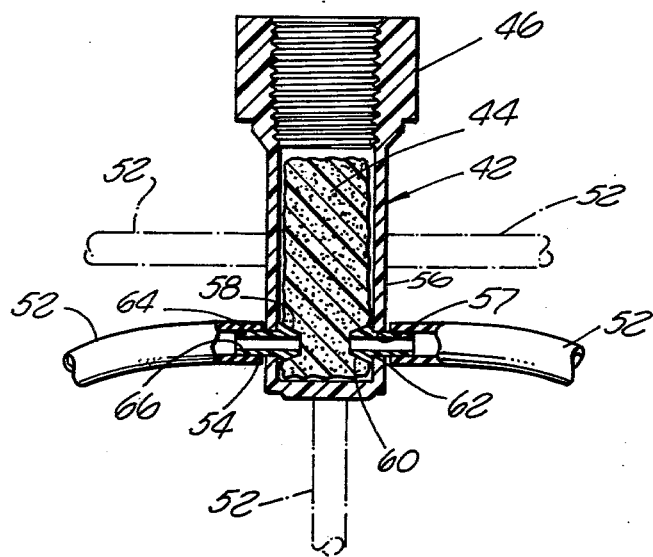
FIG. 2 is a partial cross-sectional view of the irrigation emitter system of the present invention.

Referring now to FIG. 2, the present invention is illustrated and utilizes a tubular member 42 which is similar in size and function as the tubular member 14 of FIG. 1. Positioned within the tubular member 42 is a sponge 44 which acts as a water flow restricter. The sponge 44 normally will fill the tubular member 42 below the coupling ring 46 thereof. To couple water from the member 42 to outlet hoses 52, rigid self-sealing coupling plugs 54 are utilized.

The coupling plugs 54 are typically formed of ABS (Acrylonitrile-Butadine-Styrene), manufactured by Borg-Warner under the trade name "Cycolac". The coupling plugs 54 are inserted though punched openings 57 in the tubular member wall 56. The coupling plugs 54 are formed of truncated front end 58 having a rearwardly facing shoulder 62. The truncated front end 58 is defined by a reduced front tip 60 and a centrally formed rearwardly facing shoulder 62 which abuts the interior surface of the tubular member wall 56 when inserted through the wall openings 57. Extending from the shoulder 62 and integral therewith is a cylindrical sleeve 64 whose outer diameter is approximately equal to the diameter of the opening 57.

The outer diameter of the cylindrical sleeve 64 is also approximately equal to the interior diameter of the outlet hoses 52 so that the hoses 52 can be slipped onto the cylindrical sleeve 64 and form a tight fit therewith. A bore 66 is formed in the interior of the coupling plug 54 and enables water to flow from the tubular member 42 through the coupling plug 54 and into the outlet hoses 52. As can be seen when the truncated front end tip 60 is inserted through the punched opening 57, the inserted end is forced into sponge 44.

The sponge 44 exerts an opposite force upon the coupling plug 54 forcing the rearward shoulder 62 to abut the interior surface of the tubular member wall 56 and form a seal therewith. In addition, when liquid under pressure enters the tubular member 42 an additional force is exerted by the expanded sponge 44 and a self-sealing arrangement is provided between the coupling plug 54 and the tubular member 42 at the shoulder 62 and the wall 56, respectively.

It should be noted that the density of the sponge is chosen to vary the flow of water from the coupling ring 46 into the flexible hose 52. In addition it has been found that the type of sponge utilized should preferably repel algae so as to prevent clogging of the flow of liquid in the system.

The tubular member 42 is preferably made of low density polyethylene such as Eastman Kodak 1835.

It should be understood that while the tubular member 42 has been described as having a sponge therein, other materials which function to vary the water flow could be used as well.

I claim:

1. An irrigation emitter system comprising:

a tubular adapter member formed of non-rigid plastic material;

means for securing a self-sealing coupling plug through the wall surfaces of said adapter member, said coupling plug comprising a truncated front end having a rearwardly facing shoulder which abuts the interior surface of said tubular adapter member;

pressure reducing sponge means formed in said adapter member, said coupling plug front end being forced into said pressure reducing sponge means, said sponge means exerting a sealing force on said coupling plug when liquid enters said adapter member; and means for coupling plastic hose to water flowing through said adapter plug.

2. An irrigation emitter system in accordance with claim 1 wherein said adapter member is secured to a high pressure water spigot and wherein a plurality of coupling plugs are secured to said adapter member wall surface at various points along said wall.

3. An irrigation emitter system in accordance with claim 2 wherein said coupling plugs are formed of reduced diameter coupling pipes extending through said wall.

4. An irrigation emitter system in accordance with claim 3 wherein plastic hoses are secured to the exterior portion of the coupling plugs.

5. An irrigation emitter system in accordance with claim 1 wherein said pressure reducing means substantially fills the interior of said adapter member.

* * * * *